US007801541B2

(12) United States Patent
Daniel et al.

(10) Patent No.: US 7,801,541 B2
(45) Date of Patent: Sep. 21, 2010

(54) MOBILE CELLULAR TELECOMMUNICATIONS INFRASTRUCTURE BASED MULTI-USER APPLICATIONS

(75) Inventors: Ronen Daniel, Ramat Gan (IL); Ran Wellingstein, Herzliya (IL); Yossi Wellingstein, Tel Aviv (IL)

(73) Assignee: Celltick Technologies Ltd., Herzliya (IL)

( * ) Notice: Subject to any disclaimer, the term of this patent is extended or adjusted under 35 U.S.C. 154(b) by 291 days.

(21) Appl. No.: 11/649,788

(22) Filed: Jan. 5, 2007

(65) Prior Publication Data

US 2007/0123246 A1 May 31, 2007

Related U.S. Application Data

(63) Continuation of application No. 10/475,806, filed as application No. PCT/IL01/00381 on Apr. 25, 2001, now abandoned.

(51) Int. Cl.
*H04W 4/00* (2009.01)
*H04M 3/42* (2006.01)
*H04H 60/21* (2008.01)
*A63F 9/18* (2006.01)

(52) U.S. Cl. .................. 455/466; 455/414.1; 455/414.2; 455/2.01; 273/430

(58) Field of Classification Search .................. 455/466, 455/456.3, 414.1, 414.2; 273/430; 434/236, 434/237, 238
See application file for complete search history.

(56) References Cited

U.S. PATENT DOCUMENTS 5,226,177 A    7/1993  Nickerson
6,413,160 B1   7/2002  Vancura
6,418,308 B1 * 7/2002  Heinonen et al. ......... 455/414.3
6,434,398 B1   8/2002  Inselberg
6,688,982 B2 * 2/2004  Moodie et al. ................ 463/41
7,039,259 B2   5/2006  Gil et al.
7,039,423 B2   5/2006  Daniel et al.
7,181,225 B1 * 2/2007  Moton et al. ............. 455/456.1
2001/0003099 A1  6/2001  Von Kohorn

FOREIGN PATENT DOCUMENTS

| GB | 2 327 567 A | 1/1999 |
| WO | WO 98/10604 | 3/1998 |
| WO | WO 99/42964 | 8/1999 |
| WO | WO 00/22906 | 4/2000 |
| WO | WO 01/45317 A2 | 6/2001 |
| WO | WO 02/087267 A1 | 10/2002 |

OTHER PUBLICATIONS

Gromakiv U.A., Mobile Wireless Communication Standards and Systems, Mobile TeleSystems-Eco Trands, (1997), Chapter 4, pp. 67-70, with English translation.
V.V. Afanasev and U.M. Gornostaev, Evolution of Mobile Networks (Inventory #5554), Moscow, 2001, pp. 84-87, with English translation.

* cited by examiner

*Primary Examiner*—Un C Cho
(74) *Attorney, Agent, or Firm*—Pearl Cohen Zedek Latzer, LLP

(57) ABSTRACT

The present invention is directed toward the use of Point-To-MultiPoint (PTMP) display messages over a mobile cellular telecommunications infrastructure for supporting a number of multi-user applications including multi-user interactive applications in the case of interactive display messages. Exemplary applications include a consumer survey, a multi-player game, a Content on Demand application, and the staggered broadcast of the same interactive display message over different geographical areas served by different Base Transceiver Stations (BTSs).

18 Claims, 4 Drawing Sheets

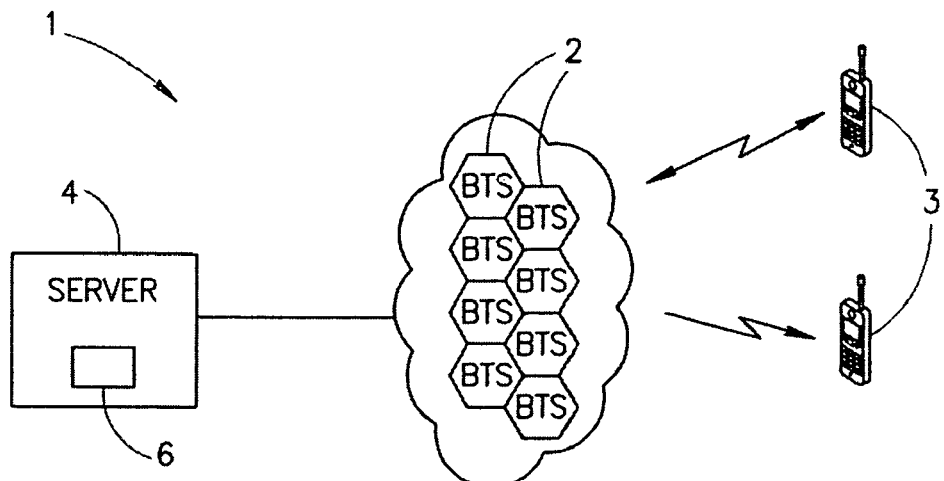

MOBILE CELLULAR TELECOMMUNICATIONS INFRASTRUCTURE BASED MULTI-USER APPLICATIONS

CROSS REFERENCE TO RELATED APPLICATIONS

This application is a continuation application of U.S. application Ser. No. 10/475,806 filed Oct. 24, 2003 now abandoned, the entire contents of which are incorporated herein by reference;

which in turn is the national phase filing of a PCT application PCT/IL01/00381 having an International Filing Date of 25 Apr. 2001 (25 Apr. 2001).

FIELD OF THE INVENTION

The invention is in the field of mobile cellular telecommunications in general, and mobile cellular telecommunications infrastructure based multi-user applications in particular.

BACKGROUND OF THE INVENTION

In WO98/10604, there is illustrated and described a method and apparatus for an interactive cell broadcast service employing Point-To-MultiPoint (PTMP) (Short Message Service) SMS messages to subscribers in respect of several interactive applications including voting, subscribing to different cellular services, and the like. The subscribers are prompted to respond by depressing a pushkey for immediately originating either a Point-To-Point (PTP) SMS message telephone call or a telephone call to an embedded callback number.

In WO99/42964, there is illustrated and described a game system in which a plurality of subscribers transmit subscriber game data to at least one central game unit in order to participate in games via SMS messages using mobile telephone devices in a mobile telephone network. The central game unit carries out games according to pre-determined rules and transmits central unit game data to the subscribers' mobile telephone devices via SMS messages through the mobile telecommunications network.

In WO00/22906, there is illustrated and described a method and system for performing electronic auctions using SMS messages between a mobile center in communication with an auction management system and a mobile phone to give information on products, current prices and accept offers, and from a mobile phone to a mobile center in order to make conditional purchase offers.

SUMMARY OF THE INVENTION

Generally speaking the present invention is directed toward the use of Point-To-MultiPoint (PTMP) display messages over a mobile cellular telecommunications infrastructure for supporting a number of multi-user applications including multi-user interactive applications in the case of PTMP interactive display messages. The term "interactive display message" within the context of the present invention implies that a subscriber can automatically activate a Point-to-Point (PTP) transmission response mechanism, for example, originating a voice call, transmitting an SMS, initiating a WAP session, and the like, from a dedicated response means integrally provided in a display message. The display messages to be displayed on subscribers' personal cellular telecommunications devices may be displayed thereon immediately, displayed in a screen saver like manner when the personal cellular telecommunications device is running a screen saver like application as illustrated and described in Applicant's co-pending PCT International Application claiming priority from Israel Patent Application 134,035, or displayed upon retrieval from an input box. The personal cellular telecommunications devices can include a wide range of mobile handheld devices including inter alia simple phones, smartphones, combined PDA/phones, combined MP3 music player/phones, and the like, employing different Operating Systems (O/Ss) including inter alia Microsoft CE, EPOC Symbian, Palm O/S, and the like.

One envisaged multi-user application involves a series of question and answer procedures for staging a consumer survey, a multi-player game, and the like. The question and answer routines typically terminate in the transmitting of either a PTP feedback message to only those subscribers who actively participated or alternatively a PTMP feedback message to all subscribers irrespective of whether they actively participated or not. Another envisaged multi-user application is the secure distribution over PTMP of a wide range of typically high value encoded Content on Demand (CoD) offerings such as multi-media clips, financial information, and the like. In this case, only subscribers who typically have expressed their interest in the CoD offerings, and are prepared to pay for them in accordance with a predetermined Schedule of Charges in a similar manner to Video on Demand (VoD) offerings, for example, per offering, as part of a subscription to a service, and the like, receive PTP messages containing the decoding information necessary for the decoding of the encoded CoD offerings for enabling their display on the subscribers' personal cellular telecommunications devices. And finally, another envisaged multi-user application is the staggered broadcast of the same PTMP interactive display message promoting a product or service over different geographical areas served by different Base Transceiver Stations (BTSs) for load balancing purposes, for example, at a call center having sales representatives for taking calls from subscribers who are interested in the product or service.

BRIEF DESCRIPTION OF THE DRAWINGS

In order to understand the invention and to see how it can be carried out in practice, preferred embodiments will now be described, by way of non-limiting examples only, with reference to the accompanying drawings, in which similar parts are likewise numbered, and in which:

FIG. 1 is a schematic representation of a mobile cellular telecommunications network for supporting a multi-user application;

FIG. 2 is a schematic representation of a database record of an exemplary consumer survey question "WHICH US PRESIDENTIAL CANDIDATE WOULD YOU VOTE FOR?";

FIG. 3 is a schematic representation of a database record of an exemplary Who Wants To Be a Millionaire multi-player game question "WHICH INVENTOR WAS GRANTED THE MOST US PATENTS?;

DETAILED DESCRIPTION OF THE DRAWINGS

Figures 4, 5A, 5B:
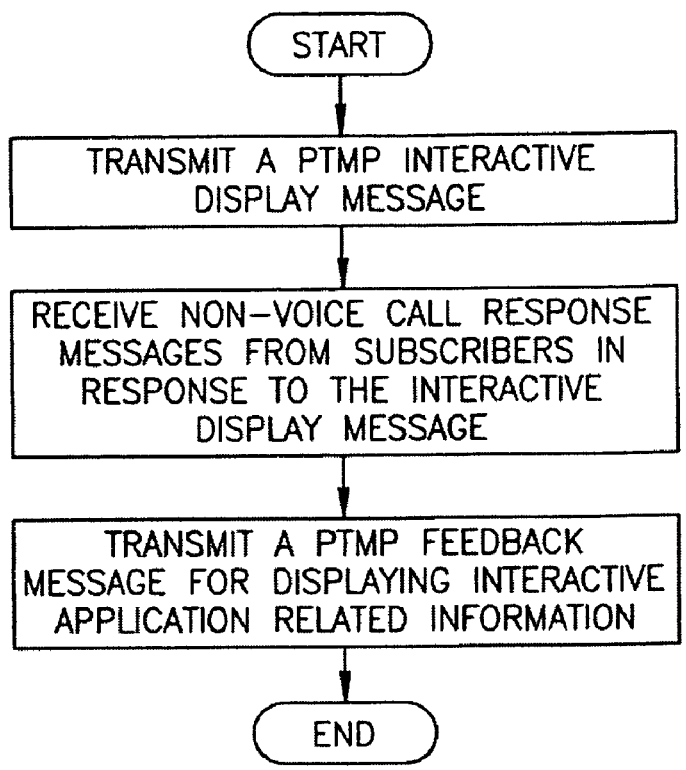
FIG. 4 is a flow diagram for staging a consumer survey over the mobile cellular telecommunications network of FIG. 1.
FIGS. 5A and 5B are schematic representations of display messages displayed on a subscriber's personal cellular telecommunications device during the staging of the consumer survey.

FIG. 1 shows a mobile cellular telecommunications network 1 including a plurality of individually addressable Base Transceiver Stations (BTSs) 2 each providing bidirectional signal coverage to a plurality of subscribers within a predefined geographical area. The BTSs 2 are each capable of transmitting Point-To-MultiPoint (PTMP) SMS messages to subscribers' personal cellular telecommunications devices 3 in their respective geographical areas. The BTSs 2 are also each capable of transmitting and receiving Point-To-Point (PTP) SMS messages to and from subscribers' personal cellular telecommunications devices 3 in their respective geographical areas. The mobile cellular telecommunications network 1 is connected to a server 4 for supporting one or more multi-user applications including multi-user interactive applications.

One such multi-user application is a consumer survey application employing a database 6 having database records 7 (see FIG. 2) including the following fields: An identifier field containing a question number for identifying a question. A question field containing a question. And, an answer field containing two or more possible answers to the question in the associated question field.

Another such multi-user application is a Who Wants To Be A Millionaire type multi-player game based on questions stored in database records 8 (see FIG. 3) similar to those of a consumer survey question but additionally including the following fields from left to right: An answer field containing four possible answers to the question. A correct answer field indicating the correct answer to the question. An additional information field indicating the order of incorrect answers to be crossed out in the case that a subscriber requests additional information. And finally, a score field indicating the high score to be awarded to a subscriber who answers a question correctly without any additional information, and a low score in the case that he answers a question correctly after having seen additional information.

The staging of a consumer survey within the geographical area covered by a single BTS 2 is as follows: The server transmits a PTMP SMS display message for displaying the question "WHICH US PRESIDENTIAL CANDIDATE WOULD YOU VOTE FOR?" together with the names of the two US presidential candidates on the personal cellular telecommunications devices of each subscriber in the selected geographical area (see FIG. 5A). Each subscriber wishing to participate in the consumer survey, proceeds to press the answer pushkey corresponding to his choice for US president, for example, a subscriber would press the pushkey "1" to vote for George Bush. On pressing one of the answer pushkeys, his personal cellular telecommunications device transmits a Point-to-Point (PTP) SMS response message including the question identifier, and his answer to the question to the server. The server determines the total number of subscribers who answered the question within a predetermined interval, say, 2 minutes from its initial broadcast, and determines the breakdown of votes between the two US presidential candidates. The server transmits a second PTMP SMS feedback message "THE RESULTS OF THE POLL ARE: GEORGE BUSH 6,707, AL GORE 6,678 TOTAL 13,385" for display on the personal cellular telecommunications devices of all the subscribers in the selected geographical area (see FIG. 5B).

The staging of a Who Wants To Be A Millionaire type multi-player game is similar to the staging of a consumer survey except that it can optionally include one or more steps. In the simplest implementation involving the same three steps as the staging of a consumer survey, the last step would typically include displaying the feedback message: "THE CORRECT ANSWER IS THOMAS EDISON. 12,153 OUT OF 17,167 SUBSCRIBERS ANSWERED CORRECTLY". A more sophisticated implementation may include providing additional information in the form of incorrect answers being scored out to help a subscriber to answer a question correctly. The additional information can be shown either in response to a subscriber asking for additional information, or automatically after a predetermined amount of time. Also, in the case of an incorrect answer, a subscriber may be prompted as to whether he wants additional information to be shown, if he wants to answer the question again, and the like. These optional steps can be executed by the server or alternatively by client applications running on subscribers' personal cellular telecommunications devices themselves.

Figure 6A:
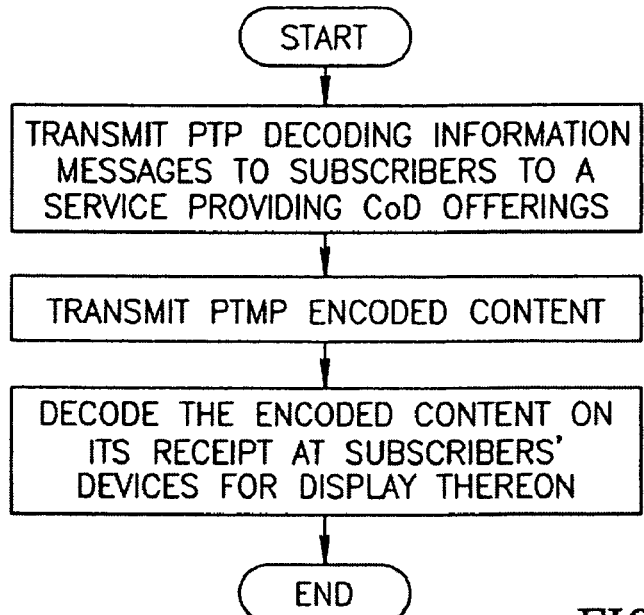
FIGS. 6A and 6B are flow diagrams for a Content on Demand (CoD) application charged in accordance with a subscription plan, and a pay-as-you-view basis, respectively.
Figure 6B:
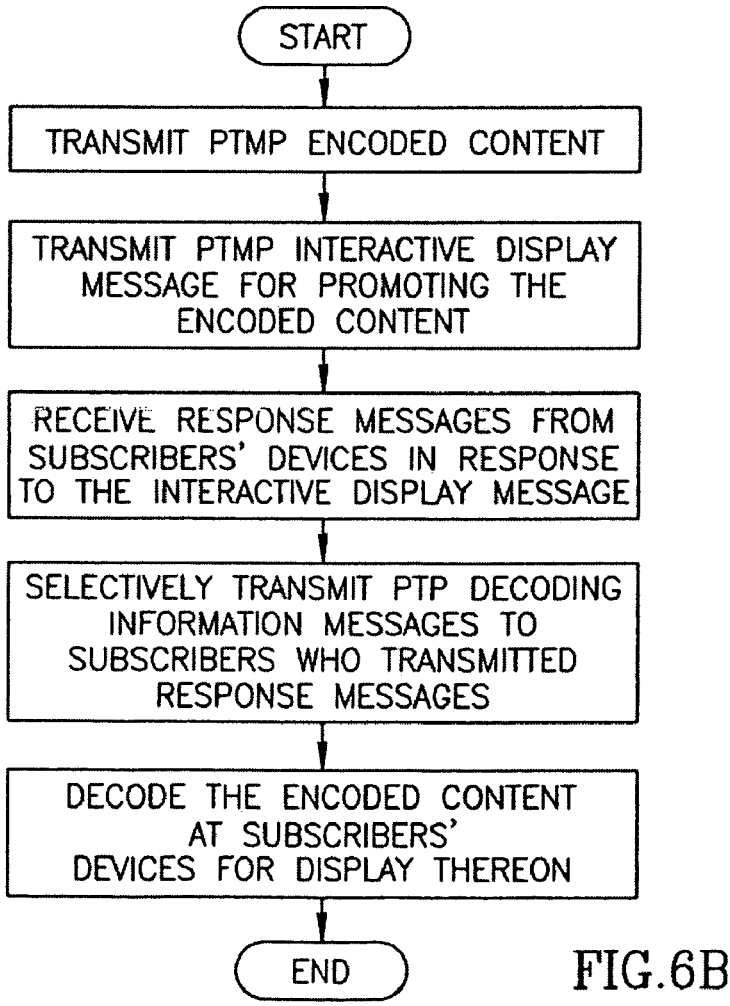

Subscribers can subscribe to a service providing Content on Demand (CoD) offerings, for example, up-to-date financial news, say, on the hour every hour. Such subscribers typically receive a PTP decoding information message, say, everyday at 00:00, containing the decoding information for decoding the CoD offerings of that service which they will receive on a regular basis for as long as they keep up their subscription to the service (see FIG. 6A). In this manner, the encoded content is immediately decoded on its receipt at a subscriber's personal cellular telecommunications device. Against this, in the case of a CoD application being charged on a pay-as-you-go basis, the PTP decoding information message is only sent pursuant to a subscriber expressing his interest in viewing an encoded COD offering promoted in a PTMP interactive display message transmitted preferably after the encoded CoD offering such that the response time until a subscriber can view the CoD offering is minimized (see FIG. 6B). Exemplary CoD offerings on a pay-as-you-go basis could include multi-media news items, goal replays at football matches, and the like. Depending on several factors including the sensitivity of the CoD offerings, their frequency, their size, and the like, the CoD offerings can be either merely scrambled or fully encrypted, for example, using the standard 56-DES algorithm.

Figure 7:
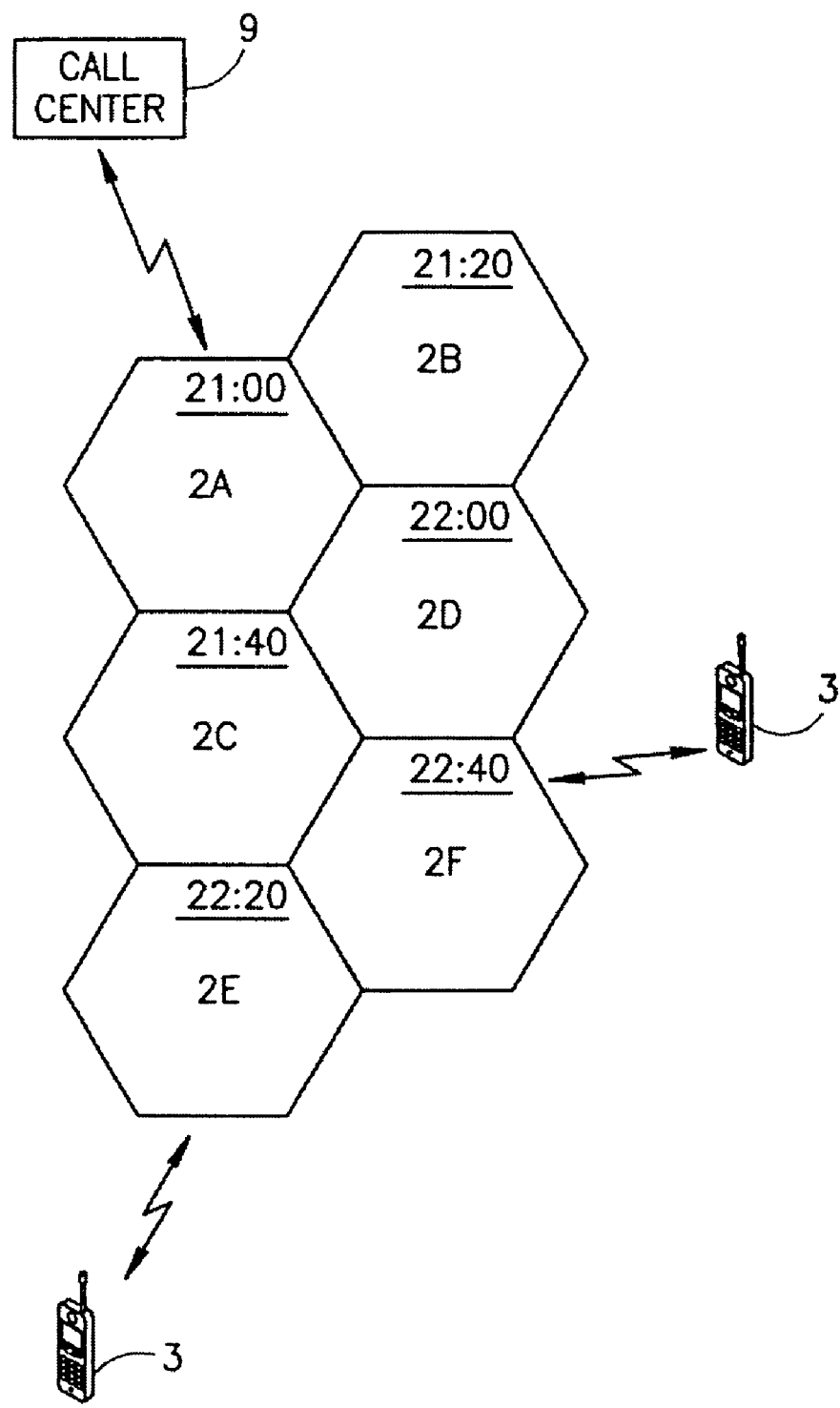
FIG. 7 is a schematic representation showing the staggered broadcast of an exemplary PTMP interactive display message "SAVE $$$$ WITH OUR NEW MORTGAGE PLAN. PRESS OK FOR DETAILS" over a wide geographical area.

FIG. 7 shows the use of the mobile cellular telecommunications network 1 for the staggered broadcast of the same PTMP interactive display message at a different BTS 2A, 2E, and 2F each covering a different area at 20 minute intervals starting at 21:00. Assuming that the interactive display message includes an embedded callback number to a call center 9 having sales representatives for taking calls from subscribers interested in hearing more details about the mortgages, the calls arriving at the call center 9 would be spread over more time than if the interactive display message would be broadcasted at all the BTSs 2A, . . . 2E, and 2F simultaneously.

While the invention has been described with respect to a limited number of embodiments, it will be appreciated that many variations, modifications, and other applications of the invention can be made within the scope of the appended claims.

We claim:

1. For use in a mobile cellular telecommunications network having a plurality of individually addressable Base Transceiver Stations (BTSs) providing bi-directional signal coverage to a plurality of cellular users who each have a personal cellular telecommunications device and who are within a plurality of predefined geographical areas, a method for executing a multi-user interactive application, the method comprising the steps of:

(a) transmitting a Point-to-Multipoint (PTMP) interactive cellular display message at a plurality of BTSs for display on the personal cellular telecommunications devices of each user located within the respective geographical areas of the plurality of BTSs, wherein the multi-user interactive application includes at least one question and answer procedure in which users may select an answer to a question from a plurality of answers;

(b) receiving non-voice call response messages from users' personal cellular telecommunications devices in response to the interactive display message; and (c) transmitting a PTMP feedback message at the plurality of BTSs of step (a) for displaying the interactive application related information on the personal cellular telecommunications devices of the users located within their respective geographical areas, wherein the interactive application related information in respect of a question includes at least an analysis of a plurality of said non-voice call response messages received in step (b) in response to the question transmitted in step (a), wherein the analysis of said non-voice call response message is selected from the group consisting of: the most popular answer to the question, a breakdown of the number of users who selected each answer to the question, the total number of users who answered the question, and the number of users who gave a particular answer to the question.

2. The method according to claim 1 wherein the multi-user interactive application is a consumer survey application, and the interactive application related information in respect of the question includes at least the most popular answer to the question based on said non-voice call response messages received in step (b) in response to the question transmitted in step (a).

3. The method according to claim 1 wherein the interactive application related information in respect of the question includes a breakdown of the number of users who selected each answer to the question based on said non-voice call response messages received in step (b) in response to the question transmitted in step (a).

4. The method according to claim 1 wherein the multi-user interactive application is a multi-player game application in which the question transmitted in step (a) has a single correct answer, and the interactive application related information transmitted in step (c) in respect of the question includes at least the number of users who answered the question correctly based on said non-voice call response messages received in step (b).

5. The method according to claim 4 wherein the interactive application related information in respect of the question also includes the total number of users who answered the question.

6. The method according to claim 5 wherein a user can request additional information whereupon one or two incorrect answers are scored out.

7. A program storage device readable by a computer and tangibly embodying a program of instructions for carrying out a method in accordance with claim 1.

8. A mobile cellular telecommunications network for carrying out a method in accordance with claim 1.

9. For use on a personal cellular telecommunications device located in a mobile cellular telecommunications network, the network having a plurality of individually addressable Base Transceiver Stations (BTSs) providing bi-directional signal coverage to the cellular users of the telecommunications devices and who are within a plurality of predefined geographical area, a method for executing a multi-user interactive application hosted by the telecommunications device, the method comprising the steps of:

(a) receiving a transmitted Point-to-Multipoint (PTMP) interactive cellular display message from at least one of a plurality of BTSs for display on the personal cellular telecommunications devices of the cellular users located within the respective geographical areas of the plurality of BTSs, wherein the multi-user interactive application includes at least one question and answer procedure in which users may select an answer to a question from a plurality of answers;

(b) transmitting a non-voice call response messages from users' personal cellular telecommunications devices in response to the interactive display message; and (c) receiving a PTMP feedback message from at least one of the plurality of BTSs of step (a) for displaying interactive application related information on the personal cellular telecommunications devices of the user when located within its geographical areas, wherein the interactive application related information in respect of a question includes at least an analysis of a plurality of said non-voice call response messages received in step (b) in response to the question transmitted in step (a), wherein the analysis of said non-voice call response message is selected from the group consisting of: the most popular answer to the question, a breakdown of the number of users who selected each answer to the question, the total number of users who answered the question, and the number of users who gave a particular answer to the question.

10. The method according to claim 9 wherein the multi-user interactive application is a consumer survey application, and the interactive application related information received in step (c) in respect of the question includes at least the most popular answer to the question based on said non-voice call response messages transmitted by a plurality of users in step (b) in response to the question transmitted in step (a).

11. The method according to claim 9 wherein the interactive application related information in respect of question includes a breakdown of the number of users who selected each answer to the question based on said non-voice call response messages transmitted in step (b) in response to the question received in step (a).

12. The method according to claim 9 wherein the multi-user interactive application is a multi-player game application in which the question received in step (a) has a single correct answer, and the interactive application related information received in step (c) in respect of the question includes at least the number of users who answered the question correctly based on said non-voice call response messages transmitted in step (b).

13. The method according to claim 12 wherein the interactive application related information in respect of the question also includes the total number of users who answered the question.

14. The method according to claim 13 wherein a user can request additional information whereupon one or two incorrect answers are scored out.

15. The method according to claim 9 wherein said PTMP receiving step (a) further includes the sub step of displaying the received display message immediately upon the receipt of the message.

16. The method according to claim 9 wherein the telecommunications device includes a memory buffer; and said PTMP receiving step (a) further includes the sub step of storing the display message in the memory buffer and displaying the stored display message when the user retrieves it.

17. The method according to claim 9 wherein the telecommunications device includes a memory buffer; and said PTMP receiving step (a) further includes the sub step of automatically storing the received display message in said memory buffer and then automatically displaying said display message when the cellular telecommunications device is running a screen saver application.

18. The method according to claim 17 wherein the screen saver application displays display messages in an idle state of the cellular telecommunication device.

* * * * *